US012718335B2

(12) United States Patent
Wong et al.

(10) Patent No.: US 12,718,335 B2

(45) Date of Patent: Aug. 25, 2026

(54) METHOD OF CT DENOISING EMPLOYING DEEP LEARNING OF MULTIPLE CO-REGISTERED SCANS OF THE SAME PERSON AND GROUP CONVOLUTIONAL NEURAL NETWORK ANALYSES

(71) Applicant: The Methodist Hospital, Houston, TX (US)

(72) Inventors: Kelvin Wong, Houston, TX (US); Stephen T.C. Wong, Houston, TX (US); John J. Volpi, Houston, TX (US)

(73) Assignee: The Methodist Hospital, Houston, TX (US)

( * ) Notice: Subject to any disclaimer, the term of this patent is extended or adjusted under 35 U.S.C. 154(b) by 237 days.

(21) Appl. No.: 18/325,602

(22) PCT Filed: Apr. 25, 2022

(86) PCT No.: PCT/US2022/000009

§ 371 (c)(1),
(2) Date: May 30, 2023

(87) PCT Pub. No.: WO2022/225580

PCT Pub. Date: Oct. 27, 2022

(65) Prior Publication Data

US 2024/0095887 A1 Mar. 21, 2024

Related U.S. Application Data

(60) Provisional application No. 63/179,178, filed on Apr. 23, 2021.

(51) Int. Cl.

*G06T 5/70* (2024.01)
*G06T 5/50* (2006.01)

(52) U.S. Cl.

CPC .................. *G06T 5/70* (2024.01); *G06T 5/50* (2013.01); *G06T 2207/10081* (2013.01);

(Continued)

(58) Field of Classification Search

CPC ... G06T 5/70; G06T 5/50; G06T 2207/10081; G06T 2207/20081; G06T 2207/20224;

(Continued)

(56) References Cited

U.S. PATENT DOCUMENTS 11,517,197 B2 * 12/2022 Zhou ..................... G06T 11/005
2018/0240219 A1 * 8/2018 Mentl ...................... G06T 5/70

(Continued)

OTHER PUBLICATIONS

Green et al., "Patient-Specific Image Denoising for Ultra-Low-Dose CT-Guided Lung Biopsies," *International Journal of Computer Assisted Radiology and Surgery*, vol. 12, No. 12, Jun. 10, 2017, pp. 2145-2155.

(Continued)

*Primary Examiner* — Jose L Couso

(74) *Attorney, Agent, or Firm* — Meunier Carlin & Curfman LLC

(57) ABSTRACT

Disclosed is a novel CT denoising method using deep learning to boost the image signal-to-noise ratio for improved disease detection in patients with acute ischemic stroke (AIS). This method reduced the original CT image noise significantly better than BM3D, with SNR improvements in GM, WM, and DG by 2.47×, 2.83×, and 2.64× respectively and CNR improvements in DG/WM and GM/WM by 2.30× and 2.16× respectively. Scans denoised by the proposed model are shown to be visually clearer with preserved anatomy. The disclosed deep learning model significantly reduces image noise and improves signal-to-noise and contrast-to-noise ratios in 380 unseen head NCCT cases.

9 Claims, 6 Drawing Sheets

(52) U.S. Cl.
CPC ............... *G06T 2207/20081* (2013.01); *G06T 2207/20224* (2013.01); *G06T 2207/30016* (2013.01)

(58) Field of Classification Search
CPC ............. G06T 2207/30016; G06T 5/60; G06T 2207/20084; G06T 11/003; G06T 11/008; G06T 2207/10072; G06T 2211/444; G06T 7/0012; G06T 7/0014; G06T 7/0016; G06T 3/4046; G06T 9/002; G06T 2207/20076; G16H 20/40; G16H 30/40; G16H 50/20; A61B 6/03; A61B 6/032; A61B 6/5258; A61B 6/563; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/764; G06V 10/774; G06V 10/82; G06V 10/84; G06V 20/41; G06V 30/18057; G06V 20/698; G06V 30/19173; G06F 18/214; G06F 18/22; G06F 18/241; G06F 18/24; G06F 18/2411; G06F 18/2415; G06F 30/27; Y10S 128/925
See application file for complete search history.

(56) References Cited

U.S. PATENT DOCUMENTS

| | | | | |
|---|---|---|---|---|
| 2018/0286037 | A1* | 10/2018 | Zaharchuk | G06T 5/60 |
| 2019/0156524 | A1 | 5/2019 | Park et al. | |
| 2019/0251713 | A1* | 8/2019 | Chen | G06T 11/006 |
| 2022/0036517 | A1* | 2/2022 | Sandfort | G16H 30/20 |
| 2022/0104787 | A1* | 4/2022 | Chan | A61B 6/5258 |
| 2022/0107378 | A1* | 4/2022 | Dey | G01R 33/56 |
| 2022/0189100 | A1* | 6/2022 | Kosomaa | G06T 15/08 |
| 2022/0375035 | A1* | 11/2022 | Chatterjee | G06N 3/045 |
| 2023/0245314 | A1* | 8/2023 | Duffy | G06N 3/048 382/128 |
| 2024/0095887 | A1* | 3/2024 | Wong | G06T 5/50 |
| 2024/0135502 | A1* | 4/2024 | Huber | G06T 5/60 |

OTHER PUBLICATIONS

Kim et al., "CNN-Based CT Denoising with an Accurate Image Domain Noise Insertion Technique," Progress in Biomedical Optics and Imaging, SPIE—International Society for Optical Engineering, vol. 11595, Feb. 15, 2021.
Search Report and Written Opinion issued for International Patent Application No. PCT/US2022/000009, dated Jul. 22, 2022, 10 pages.
Wu Dufan et al: "Learning-based CT Perfusion Image Denoising with Only Noisy Training Data", 2019 IEEE Nuclear Science Symposium and Medical Imaging Conference (NSS/MIC), IEEE, Oct. 26, 2019 (Oct. 26, 2019), pp. 1-3, XP033747822, DOI: 10.1109/NSS/MIC42101.2019.9059711.
Zhicheng Zhang et al: "Noise2Context: Context-assisted Learning 3D Thin-layer Low Dose CT Without Clean Data", arxiv.org, Cornell University Library, 201 Olin Library Cornell University Ithaca, NY 14853, Nov. 25, 2020 (Nov. 25, 2020).
Jaakko Lehtinen et al: "Noise2Noise: Learning Image Restoration without Clean Data", arxiv.org, Cornell University Library, 201 Olin Library Cornell University Ithaca, NY 14853, Mar. 12, 2018 (Mar. 12, 2018).
Extended European Search Report in European Patent Office (EP). Received on Mar. 5, 2026.

* cited by examiner

METHOD OF CT DENOISING EMPLOYING DEEP LEARNING OF MULTIPLE CO-REGISTERED SCANS OF THE SAME PERSON AND GROUP CONVOLUTIONAL NEURAL NETWORK ANALYSES

CROSS-REFERENCE TO RELATED APPLICATIONS

The present application is a continuation of PCT International Patent Appl. No. PCT/US2022/000009, filed Apr. 25, 2022 (now nationalized), which claims priority to U.S. Provisional Patent Application 63/179,178, filed Apr. 23, 2021 (lapsed), the contents of which is specifically incorporated herein in its entirety by express reference thereto.

STATEMENT REGARDING FEDERALLY SPONSORED RESEARCH OR DEVELOPMENT

None.

NAMES OF THE PARTIES TO A JOINT RESEARCH AGREEMENT

Not Applicable.

BACKGROUND OF THE INVENTION

Field of the Invention

The present disclosure relates generally to the field of diagnostic imaging, and in particular, to methods of computed tomography (CT) noise reduction using multiple co-registered CT scans from the same person, and comparisons to group convolutional neural network analyses.

Description of Related Art

Computed tomography (CT) is commonly used to image different parts of the body with or without contrast injection. The quality (i.e., resolution and/or precision) of a CT image is an important factor for accurate diagnosis of a lesion or defect. To advance the effectiveness of commercial CT systems, it remains necessary to continually improve the quality of an acquired CT image. Examples of such efforts may include, without limitation, a multi-channel detector technology and a high-speed high-resolution image reconstruction technology. However, most of the conventional efforts to improve the quality of a CT image may cause high-dose radiation exposure and thus cause an increased cancer risk to patients. Particularly, considering the recent public awareness of radiation exposure, the efforts to acquire a high-quality diagnostic image need to be accompanied by efforts to minimize a radiation dose. The resulting computed tomography (CT) scan produces a cross-sectional image of the body lying in a cylinder-shaped large machine equipped with an X-ray generator. This enables a user to more clearly see structures and lesions due to less overlap of structures as compared to a regular X-ray. Therefore, the CT scan has been widely used for scans of most of the organs and diseases. Its image quality is directly related to the amount of ionizing radiation dose. It is especially limiting in CT of the brain where increased radiation is known to cause damage and hamper brain development. Therefore, brain CT is known for excessive image noise and low image contrast.

Brain CT can be done quickly for diagnosis of different neurological conditions (stroke, hemorrhage, and it is especially useful in emergency settings to identify structural changes in the brain with few contraindications. Common applications include identifying brain swelling, bleeding or stroke. Advanced applications such as contrast enhanced CT angiography is used to identify blood vessels changes in the brain whereas CT perfusion is used to look at blood flow and tissue perfusion in the brain.

Brain CT is usually done first on patients with suspected stroke in emergency settings. Ischemic stroke is the most common form of adult stroke (>80%) whereas hemorrhagic stroke is second most common. Brain CT can detect hemorrhagic stroke easier than ischemic stroke. Most ischemic strokes are missed during the first 3 hours of stroke onset unless it is very large. This is due to excessive image noise in the brain CT and the small change of contrast during early stroke onset. CT intensity, measured as Hounsfield Unit (HU), is known to decrease slowly during first 6 hours of ischemic stroke at about 0.5 HU/hour in white matter, about 0.7 HU/hour in deep gray matter and about 1.2 HU/hour in cortical gray matter. Typical CT image noise in brain tissue is about 4 HU to 8 HU, with the lower end common for normal body mass index (BMI) and upper end common for high BMI (>=60).

In this disclosure, the inventors have developed new and effective methods for reducing CT image noise using a trained model. Demonstrated here is the feasibility of the method in brain CT where image quality is limited by radiation dose. This model takes a noisy brain CT as input and output a denoised CT with significant increase in image quality.

A model is trained by multiple noisy CT images of the same patient that are visually different using convolutional neural network (CNN). Multiple noisy CT images from person A which are visually different but free from geometric distortion are averaged to create a low noise CT of person A. Using CNN with encoder and decoder architecture, the inventors' map each noisy CT image from person A to the low noise CT image of the same person, even though some areas are visually different. This process is achieved through the use of the custom designed loss function disclosed herein.

The inventors trained a model using 95 brain CT from 21 patients and validated it on 12 patient cases from 3 patients with statistically significant results. Using the method disclosed herein, image noise in brain tissue was reduced by approximately 2.5× to 3.5× or increase the contrast of detection by the same amount.

Denoised CT changes how early ischemic stroke can be detected and treated—especially during the first 6 hours of stroke onset. This is especially true when MRI is not available in the emergency settings (~90% in US) or MRI is not an alternative for the patient (claustrophobia/metal implant/non-compatible pacemaker, etc.). Traditional methods either use repeated CT scans on the same patient at the same position or additional high or low radiation dose CT scans. Both are suboptimal in performance and expose the patients to unnecessary scans and potentially harmful level of radiation.

Deficiencies in the Prior Art

Prior art using mean square error of the pixel difference between input image and training label as loss function, which is insufficient to reduce noise visually due to different degrees of freedom to achieve low mean square error. The performance of our method is superior to prior art methods.

Existing CT denoising technology is limited to the availability of repetitive image data that are near identical both in the CT image domain or the CT raw data domain to obtain a low noise and high noise mapping. The availability of large amount of high radiation dose CT data of human brain is also not available as it will cause harm to the patients. The disclosed method does not need high radiation dose CT images and avoids this problem.

CT denoising for the brain helps to detect ischemic stroke early and avoid missed diagnosis. Patients with ischemic stroke can be treated promptly, which is especially crucial during the first 6 hours of stroke onset. Patient outside 6 hours window may not be eligible for treatment.

The unique solution provided herein is based on repeating image data that are different, which is easily available in scale as compared to traditional methods requiring repeating image scans on the same positions or different CT dosing scans and can be synergistically combined with denoising technology using CT raw image data. The denoising performance using our custom loss function will improve further with more data.

SUMMARY

The present invention overcomes these and other limitations inherent in the prior art by providing a method to remove CT image noise. Multiple CTs of person A from different timepoints that are free from distortion, such as brain swelling, are used in this method. Skull and extracranial bright area (e.g., head holder) are removed from the CT image. Multiple timepoint CTs from person A are intensity normalized and spatially coregistered to CT at each timepoint to create a mean CT. The normal brain region in the mean CT will have image noise reduced roughly proportional to $\sqrt{n}$ where n is the number of noisy CTs of person A used. The abnormal (brighter or darker) brain regions in the mean CT image will not have consistent noise reduction effect and its intensity can vary greatly compared to the same region in the noisy CT image. An illustrative figure of how the mean CT image is created for each person is shown in FIG. 1.

To reduce the CT image noise, a CNN with encoder-decoder architecture is used to map the single mean CT and noisy CT. The necessary components of the custom loss function are defined by:

$$\text{Loss} = \frac{1}{n}\sum_{i=0}^{n}(Y_{i\_pred} - Y_{Mean})^2 + k_1|M(Y_i, Y_{i\_pred})| + k_2|S(Y_i, Y_{i\_pred})|$$

where $Y_i$ is the input single timepoint CT, $Y_{i\_pred}$ is the denoised single timepoint CT, $Y_{Mean}$ is the multiple timepoints mean CT.

M(x,y) is the mode of x-y, S(x,y) is the skew of x-y. The paired difference of ($Y_i - Y_{i\_pred}$) and ($Y_{i\_pred} - Y_{Mean}$) are all masked to have an absolute value that are larger than zero and smaller than TH.

BRIEF DESCRIPTION OF THE DRAWINGS

The following drawings form part of the present specification and are included to demonstrate certain aspects of the disclosure. For promoting an understanding of the principles of the invention, reference will now be made to the embodiments, or examples, illustrated in the drawings and specific language will be used to describe the same. It will, nevertheless, be understood that no limitation of the scope of the invention is thereby intended. Any alterations and further modifications in the described embodiments, and any further applications of the principles of the invention as described herein are contemplated as would normally occur to one of ordinary skill in the art to which the invention relates.

The invention may be better understood by reference to the following description taken in conjunction with the accompanying drawings, in which like reference numerals identify like elements, and in which:

FIG. 6A shows high-contrast ACR Quality Phantom scanned using CT Head 2.5 mm protocol with standard reconstruction before and after denoising with FIG. 6B showing the zoomed-in view. Window level and width are 1100 HU and 100 HU, respectively. From left top down to right: 4 lp/cm, 5 lp/cm, 6 lp/cm 7 lp/cm, 8 lp/cm, 9 lp/cm, 10 lp/cm, 12 lp/cm. FIG. 6C shows low-contrast resolution comparison of CNR on ACR 464 phantom before and after denoising at window level and width of 100 HU and 100 HU, respectively.

DESCRIPTION OF ILLUSTRATIVE EMBODIMENTS

Figure 1:
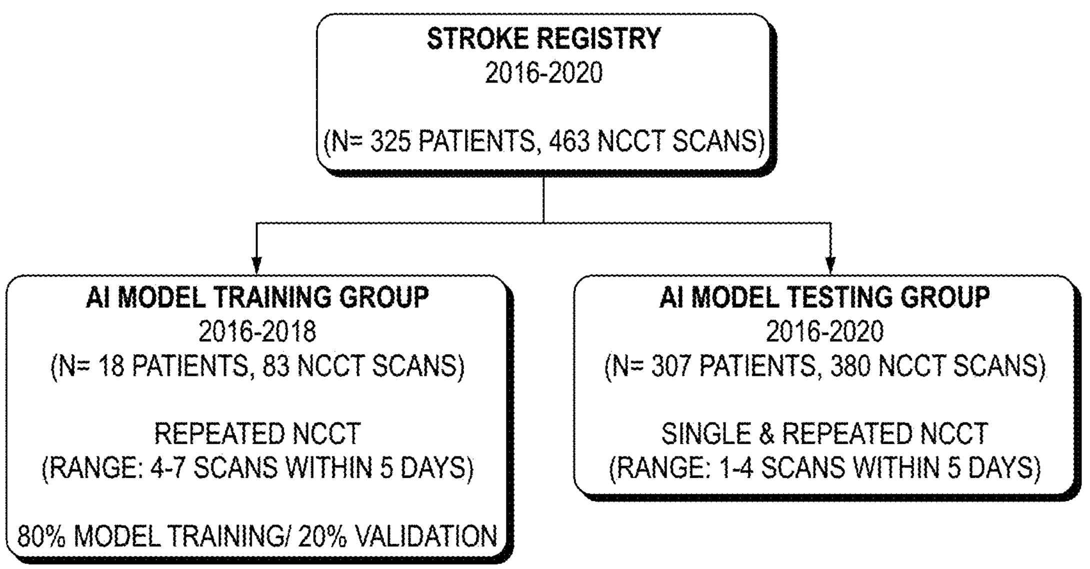
FIG. 1 is a flow diagram illustrating distribution of 325 patients into training and testing groups. The AI Model Training Group dataset was split 80/20 for training and validation.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

A study was conducted to demonstrate the learning capability of the disclosed custom loss function in denoising brain CT. Full dose non-contrast CT (2.5 mm slice thickness, multiple vendors, 95 cases) from 21 acute ischemic stroke patients were included. A rotational equivariant UNet (FIG. 2) was used to map the original CT to the mean CT using the said custom loss function to removing image noise. Noise reduction was quantified in 12 cases using root mean squared error (RMSE) and structural similarity index (SSIM) reference to the mean CT. The results obtained using the new method were compared to other state-of-the-art methodologies such as block matching 3D (BM3D) with different noise settings (BM3Di: where i HU is the standard deviation of image noise) and to a lesser extent, discrete cosine transform (DCT). Visual improvements are demonstrated in representative stroke cases with missed stroke.

Using this method, the image noise in the original CT from RMSE of 8.68±1.74 HU to 5.18±0.99 HU ($p<1e-5$) was reduced. Image similarity to the mean CT improved from SSIM of 0.59±0.03 to 0.80±0.03 ($p<1e-5$), when image background is not considered. Representative cases of AI denoising improvement in missed small stroke and larger stroke cases are shown in FIG. 3A, FIG. 3B, FIG. 3C, FIG. 3D, and FIG. 4. AI denoising improves gray/white matters junction and ischemia stroke visualization which is confirmed by diffusion MRI 4.5-6 hours later.

The results obtained using the present method were substantially superior to that which is possible using other methods, algorithms, and deep learning, including those methods that rely on an artificial, or synthetic comparison data set such as that described in U.S. Pat. No. 10,891,762 to Park and Kim, the contents of which is specifically incorporated herein in its entirety by express reference thereto.

EXAMPLE

The following Example is included to demonstrate illustrative embodiments of one or more aspects of the claimed invention. It should be appreciated by those of skill in the art that the techniques disclosed in the following Example represents techniques discovered by the inventors to function well in the practice of the invention, and thus can be considered to constitute preferred modes for practicing one or more aspects of the disclosed methods. However, those of skill in the art should, in light of the present disclosure, readily appreciate that many changes can be made in the specific embodiments which are disclosed and still obtain a like or similar result without departing from the spirit and scope of the invention.

Retrospective Study of Deep Learning to Reduce Noise in Non-Contrast Head CT Images

Materials and Methods

In this retrospective study, confirmed AIS patients with full-dose NCCT head scans were randomly selected from a stroke registry between 2016-2020. 325 patients (67±15 years, 176 men) were included. 18 patients each with 4-7 NCCTs performed within 5-day timeframe (83 total scans) were used for model training; 307 patients each with 1-4 NCCTs performed within 5-day timeframe (380 total scans) were used for hold-out testing. In the training group, a mean CT was created from the patient's co-registered scans for each input CT to train a rotation-reflection equivariant U-Net with group convolutional neural network (G-CNN) modification to remove image noise. Denoising performance was compared to the standard Block-matching and 3D filtering (BM3D) method quantitatively and visually. Signal-to-noise ratio (SNR) and contrast-to-noise (CNR) were measured in manually drawn regions-of-interest in grey matter (GM), white matter (WM) and deep grey matter (DG).

Supporting data for this study are available from the corresponding author upon reasonable request, with consideration given to sensitive clinical nature of the data. All the work presented involved review of the patients' imaging data and is approved by an institutional review board with informed consent waiver.

Patient Selection

In this retrospective study, AIS patients with full-dose thin slice (2.5-3.0 mm) NCCT head scans were randomly selected from an internal stroke registry between 2016-2020, including cases with averted stroke. Ultimately, 325 patients were included with the infarct location and acuity identified per radiology report. These 325 patients were split into AI-training and AI-testing groups (FIG. 1). The training group included 18 patients, each with 4-7 full-dose NCCT head scans performed within a 5-day time window between 2016-2018, comprising a total of 83 CT scans (5,518 images). The inventors manually reviewed all CT scans in the training group for brain deformation or excessive artifacts to ensure reasonable similarity between repeated scans in the same patient. One CT scan was excluded due to excessive head movement. The training dataset was split 80/20 for training and validation. The testing group included 307 patients each with 1-4 NCCT scans performed within a 5-day time window between 2016-2020, comprising a total 380 CT scans (25,773 images). Deidentified patient demographics including age, sex, and race were collected.

Neuroimaging is critical for managing many neurological conditions. Non-contrast head CT (NCCT) is often the initial imaging modality for acute neurologic insults, such as acute ischemic stroke (AIS) (1) or traumatic brain injury (TBI) (2). NCCT scan time is only a few seconds, and full studies require only minutes to complete. CT is widely available and has few contraindications for evaluating traumatic skull fractures, hemorrhage, cerebral edema, or large mass effects, making it useful in the emergency departments where MRI is relatively unavailable or even contraindicated in patients with ferromagnetic substances such as shrapnel and other incompatible implants. However, in the hyperacute timeframe after a neurological insult, such as AIS or TBI, NCCT changes are often too subtle to reliably detect. The utility of NCCT in diagnosis may be improved by reducing the image noise and increasing the overall signal-to-noise ratio (SNR) and contrast-to-noise ratio (CNR) between different tissue types (3).

Prior work has aimed to improve CT image quality through post-processing methods while reducing radiation exposure. However, lower radiation doses increase image noise, hampering CT image interpretation. Consequently, many algorithms have attempted to denoise low-dose (3-6) or ultra-low-dose (7) CT images in the image domain with various signal processing methods in order to improve the image quality and restore the SNR and CNR to that of the full-dose CT. A popular gold-standard denoising method is Block-matching and 3D filtering (BM3D) (8). Alternative methods have investigated denoising low-dose CT images in the raw scan data domain during image reconstruction (5, 6, 9-14). Unfortunately, raw scan data are prohibitively large and not routinely archived. Therefore, reconstruction-based methods can only be applied to newly acquired scans and not retrospectively.

To address the challenge of denoising full-dose NCCT images from multiple models and manufacturers, a novel deep learning method was developed with built-in robustness that can improve the SNR and CNR in any given head NCCT, while preserving noise texture and image contrast.

Data Preprocessing and Normalization

Each head CT scan was unique due to variations in date and time of acquisition, scanner manufacturer or model, imaging protocols (120 kV, variable exposure time and tube current), radiation dose, head position, imaging plane, etc. All cases were skull-stripped to reduce image reslicing artifacts. The image attenuation distribution of the brain tissue was normalized after shifting the attenuation mode to a fixed value (37 HU) to eliminate attenuation shifts due to scanner calibration.

For each separate CT scan in the training data, a corresponding mean CT was created as a training label. This low-noise mean CT was created by co-registering the skull-stripped CT scans from a patient set to each input CT scan using SPM12 (15) (University College of London, UK). In this method, normal variations of image noise, imaging planes and head positions were preserved in the input images to minimize interpolation artifacts. To prevent additional interpolation artifacts, data augmentation was not used.

Deep Learning Denoising Model

Figure 2:
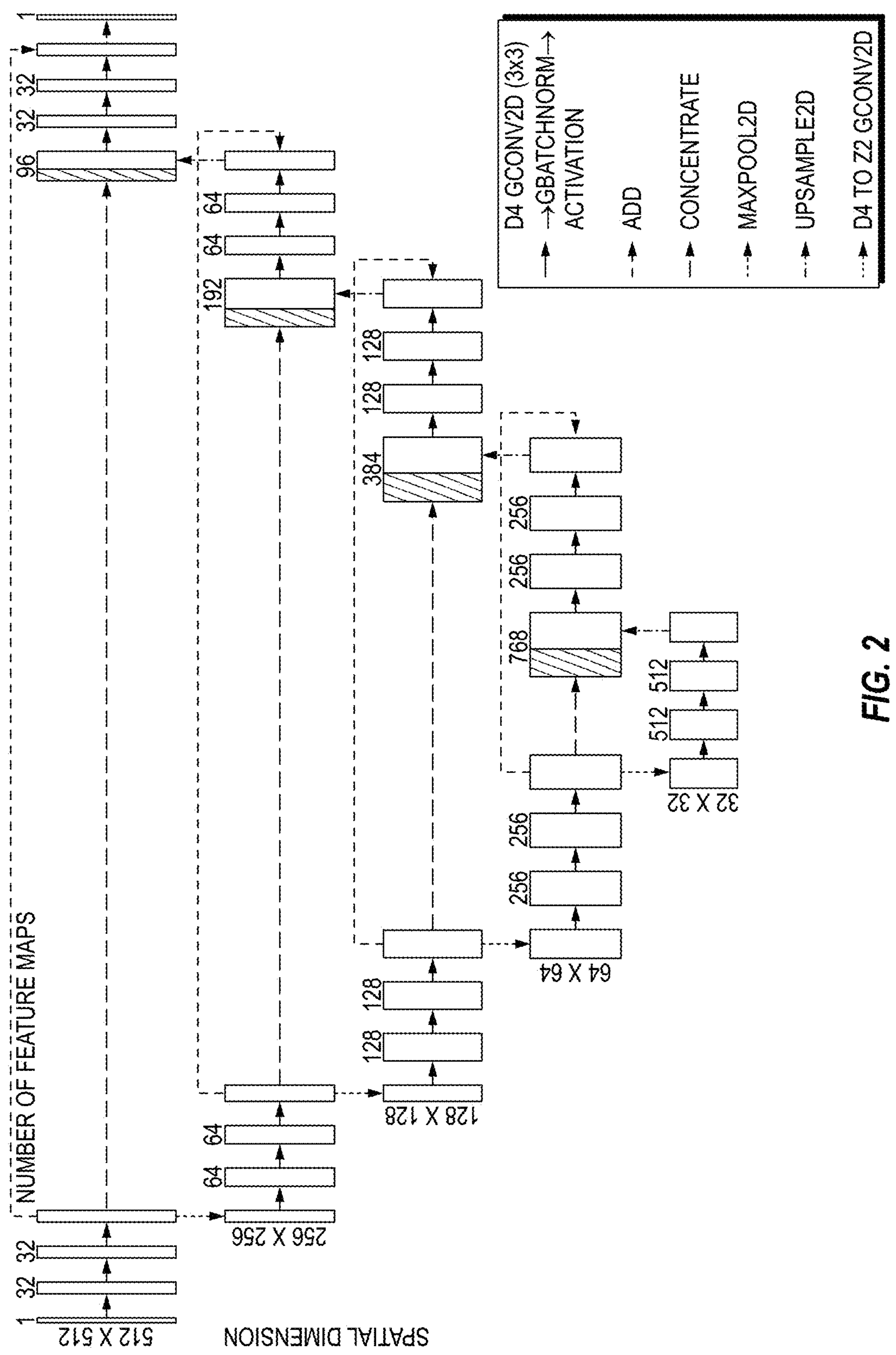
FIG. 2 shows an illustration of the deep learning model architecture used for denoising.

The disclosed deep learning CT denoising model was built on a rotation-reflection equivariant U-Net using group convolutions (16, 17) (G-CNN) with a custom loss function. The network structure is illustrated in FIG. 2. This structure guarantees that output image transformations correspond to the input image transformations from 90-degree rotations, image reflections, or both. This property holds true at all convolutional levels, which cannot be achieved with input data augmentation, resulting in a more data-efficient and robust network. The network was implemented on Keras with Tensorflow core v1.13 backend (18) (Google Inc, CA), with randomly initialized model parameters. To construct the custom loss function, we assumed, without loss of generality, that the original noisy CT image can be loosely defined as a mean CT image plus 1) image noise distribution that is zero-centered and symmetric, and 2) non-zero-centered outliers that are far from zero due to evolving stroke (e.g., necrosis/hemorrhagic transformation) between the mean CT and the noisy CT. We defined features outside the learning scope using a threshold (TH). If the absolute attenuation difference between a voxel in the mean CT and the original noisy CT was greater than or equal to TH, it was not considered in the mapping process or training loss function. The value of TH was chosen to be 10 HU as image noise, measured by standard deviation, typically ranges from 4 to 6 HU. The loss function is the weighted sum of the mean-square error, the modal shift of the image noise, and the skewness of the image noise as follows:

$$\text{Loss} = \frac{1}{n}\sum_{i=0}^{n} MSE + w_1|M| + w_2|S| \quad \text{Equation 1}$$

Where n is the number of training samples, MSE is the mean-square error between the between the predicted CT and mean CT (ground truth), M and S are the mode and skewness coefficient respectively of the noise distribution calculated by the voxel-wise attenuation difference between the input and predicted CT, and $w_i$ is the weight of the term. Paired difference images are masked to have an absolute value between zero and our threshold (TH).

Model Comparison

The proposed G-CNN CT denoising model was evaluated against the BM3D method in the hold-out testing dataset. The BM3D model was tuned with varying levels of noise (noise standard deviation of 5 HU and 10 HU). The original CT and CTs denoised by either deep learning or BM3D were compared against the gold-standard mean CT. Denoising performance was compared using the top thirty image slices (7.5 cm or 3.0 in) of each case, which covered the supratentorial region, where most lesions are located. This avoids comparing variable bone-induced streak artifacts caused by differential head positioning and scanning planes. Three cases were selected to assess stroke lesion visualization over three scans at different timepoints. The fold-increase in CNR between ischemic tissue and contralateral normal tissue was calculated for original and denoised images. Scans in which the ischemic lesion was missed, per radiology report, were marked.

To assess the spatial resolution impact, the model was applied to scans of ACR 464 accreditation phantom (Sun Nuclear, Melbourne, FL). High-contrast spatial resolution was assessed through visualizing spatial frequency bars and comparing the limiting spatial resolution before and after denoising. Low-contrast resolution was assessed through calculating CNR before and after denoising.

Statistical Analysis

Denoising performance was evaluated using signal-to-noise ratio (SNR) and contrast-to-noise ratio (CNR). Regions-of-interest (ROIs) were manually defined in visually normal areas of the cerebral cortex/grey matter (GM), corpus callosum/white matter (WM), and thalamus/deep grey matter (DG) using MRI-cro (19) (version 1.40). The results are compared per scan using a one-tailed paired t-test. Statistical analysis was performed using R (20) (version 3.6.1). SNR and CNR were calculated as follows:

$$SNR = \frac{\text{mean}[ROI_1]}{\sigma[ROI_1]} \quad \text{Equation 2}$$

$$CNR = \frac{(\text{mean}[ROI_1] - \text{mean}[ROI_2])}{\sigma[ROI_1]} \quad \text{Equation 3}$$

Results 325 patients with acute ischemic strokes were included (FIG. 1). Eighteen patients (mean age: 64±12 years, range: 39-79 years, 8 men and 10 women) with repeated NCCT (range: 4-7 scans within 5 days) from 2016 to 2018 were assigned to the training group; 307 patients (mean age: 67±15 years, range: 23-98 years, 168 men and 139 women) from 2016 to 2020 were assigned to the hold-out testing group. Detailed patient demographics are shown in Table 1 with clinical characteristics, including stroke vascular distribution, shown in Table 2. Table 3 shows the distribution of scanner manufacturers and models. The median CT dose index (CTDIvol) was 54.7 mGy with IQR [54.0-58.7 mGy].

TABLE 1

PATIENT DEMOGRAPHICS: CHARACTERISTICS OF THE 325 PATIENTS INCLUDED FOR ANALYSIS

Patient Demographics

| Patient Characteristics | Training | Hold-out Testing |
|---|---|---|
| Age (years) | Mean: 64 ± 12, Range: 39-79 | Mean: 67 ± 15, Range: 23-98 |
| Sex (%) | | |
| Men | 8/18 (44%) | 168/307 (55%) |
| Women | 10/18 (56%) | 139/307 (45%) |
| Race (%) | | |
| Caucasian | 6/18 (33%) | 162/307 (53%) |
| Black | 6/18 (33%) | 91/307 (30%) |
| Hispanic or Latino | 3/18 (17%) | 38/307 (12%) |
| Asian | 3/18 (17%) | 16/307 (5%) |

TABLE 2

Clinical Characteristics

| Neuroimaging Characteristics | Training | Hold-out Testing |
|---|---|---|
| Acute Ischemia (%) | 15/18 (83%) | 150/307 (49%) |
| Side (%) | | |
| Left | 5/18 (28%) | 81/307 (26%) |
| Right | 5/18 (28%) | 56/307 (18%) |
| Bilateral | 5/18 (28%) | 12/307 (4%) |
| Vascular Distribution (%) | | |
| ACA | 1/18 (6%) | 3/307 (1%) |
| MCA | 9/18 (50%) | 100/307 (33%) |
| PCA | 4/18 (22%) | 25/307 (8%) |
| BA/VA/ICA | 6/18 (33%) | 25/307 (8%) |
| Chronic Ischemia (%) | 13/18 (72%) | 176/307 (57%) |
| Hemorrhage (%) | 13/18 (72%) | 13/307 (4%) |
| NCCT without ischemia or hemorrhage (%) | 0/18 (0%) | 65/307 (21%) |

TABLE 3

DISTRIBUTION OF MANUFACTURERS AND MODELS OF CT SCANNERS USED IN THIS STUDY

CT Scanner Manufacturers and Models

| Manufacturer | Model | Percent (%) |
|---|---|---|
| GE Medical Systems | BrightSpeed | <1 |
| GE Medical Systems | Discovery CT | 30 |
| GE Medical Systems | LightSpeed VCT | 21 |

TABLE 3-continued

DISTRIBUTION OF MANUFACTURERS AND MODELS OF CT SCANNERS USED IN THIS STUDY

CT Scanner Manufacturers and Models

| Manufacturer | Model | Percent (%) |
|---|---|---|
| GE Medical Systems | Revolution CT | 16 |
| GE Medical Systems | Revolution HD | 20 |
| GE Medical Systems | Discovery IQ | <1 |
| GE Medical Systems | Optima CT660 | 4 |
| GE Medical Systems | Revolution GSI | 1 |
| Siemens | SOMATOM Definition Edge | 2 |
| Siemens | SOMATOM Definition Flash | 1 |
| Siemens | SOMATOM Force | 5 |

Clinical characteristics: neuroimaging characteristics of the 325 patients included for analysis. These patients were all confirmed to have acute ischemic stroke (AIS) from our stroke registry, including cases with averted stroke. The presence of chronic ischemia or hemorrhage in these cases is indicated. Acute ischemia side is reported as left, right, or bilateral. Acute ischemia vascular distribution is reported as anterior cerebral artery (ACA), middle cerebral artery (MCA), posterior cerebral artery (PCA), or basilar artery (BA)/vertebral artery (VA)/internal carotid artery (ICA). NCCT without ischemia or hemorrhage may represent averted stroke or stroke initially undetected.

Figure 3:
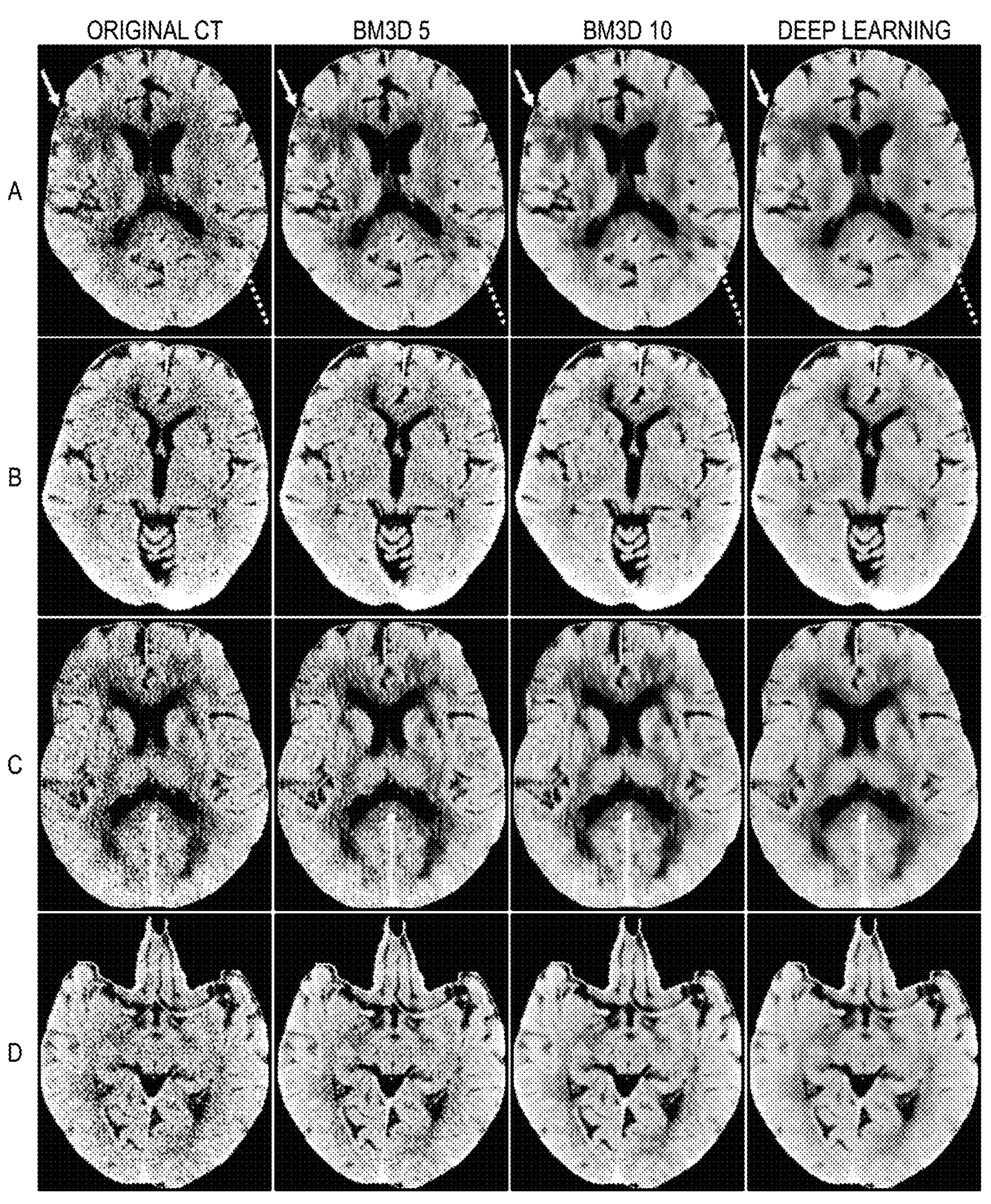
FIG. 3A, FIG. 3B, FIG. 3C, and FIG. 3D are visual comparisons between the original CT, Block-matching and 3D filtering (BM3D) models with noise standard deviation at 5 and 10 Hounsfield units (HU), and Deep Learning model on four representative test cases. Per radiology reports, (FIG. 3A) subacute infarct in the right frontal lobe and insular region (solid arrow) and acute infarct in the left posterior parietotemporal region (dashed arrow), (FIG. 3B, FIG. 3C, and FIG. 3D) no acute pathology visible.

Visual comparisons of the images denoised by different models were evaluated on four representative test cases (FIG. 3A). This figure compares a case with a subacute infarct in the right frontal lobe and insular region (solid arrow) and acute infarct in the left posterior parietotemporal region (dashed arrow). FIG. 3B, FIG. 3C, and FIG. 3D show the model comparison for three cases without acute pathology (per radiology reports). The disclosed model successfully denoised the original CT while preserving the noise texture of the mean CT. In comparison, BM3D denoising altered noise texture from unordered to ordered, resulting in an artificial appearance.

TABLE 4

SNR AND CNR EVALUATION

| Model | SNR GM | SNR WM | SNR DG | CNR GM/WM | CNR DG/WM |
|---|---|---|---|---|---|
| Original | 7.83 ± 1.39 | 5.83 ± 0.97 | 7.66 ± 1.31 | 1.76 ± 0.48 | 1.88 ± 0.49 |
| BM3D 5 | 11.83 ± 3.24 | 8.90 ± 2.23 | 11.62 ± 2.89 | 2.66 ± 0.89 | 2.87 ± 0.94 |
| BMD 10 | 16.68 ± 5.19 | 13.65 ± 4.01 | 17.45 ± 4.94 | 3.73 ± 1.33 | 4.31 ± 1.56 |
| Deep Learning | 19.41 ± 4.35 | 16.48 ± 3.10 | 20.26 ± 3.97 | 3.80 ± 1.09 | 4.33 ± 1.19 |

SNR and CNR Evaluation: mean±standard deviation of signal-to-noise ratio (SNR) and contrast-to-noise ratio (CNR) for the 307 hold-out test patients (380 cases). SNR was measured in the cerebral cortex grey matter (GM), corpus callosum white matter (WM), and thalamus deep grey matter (DG).

Figure 4:
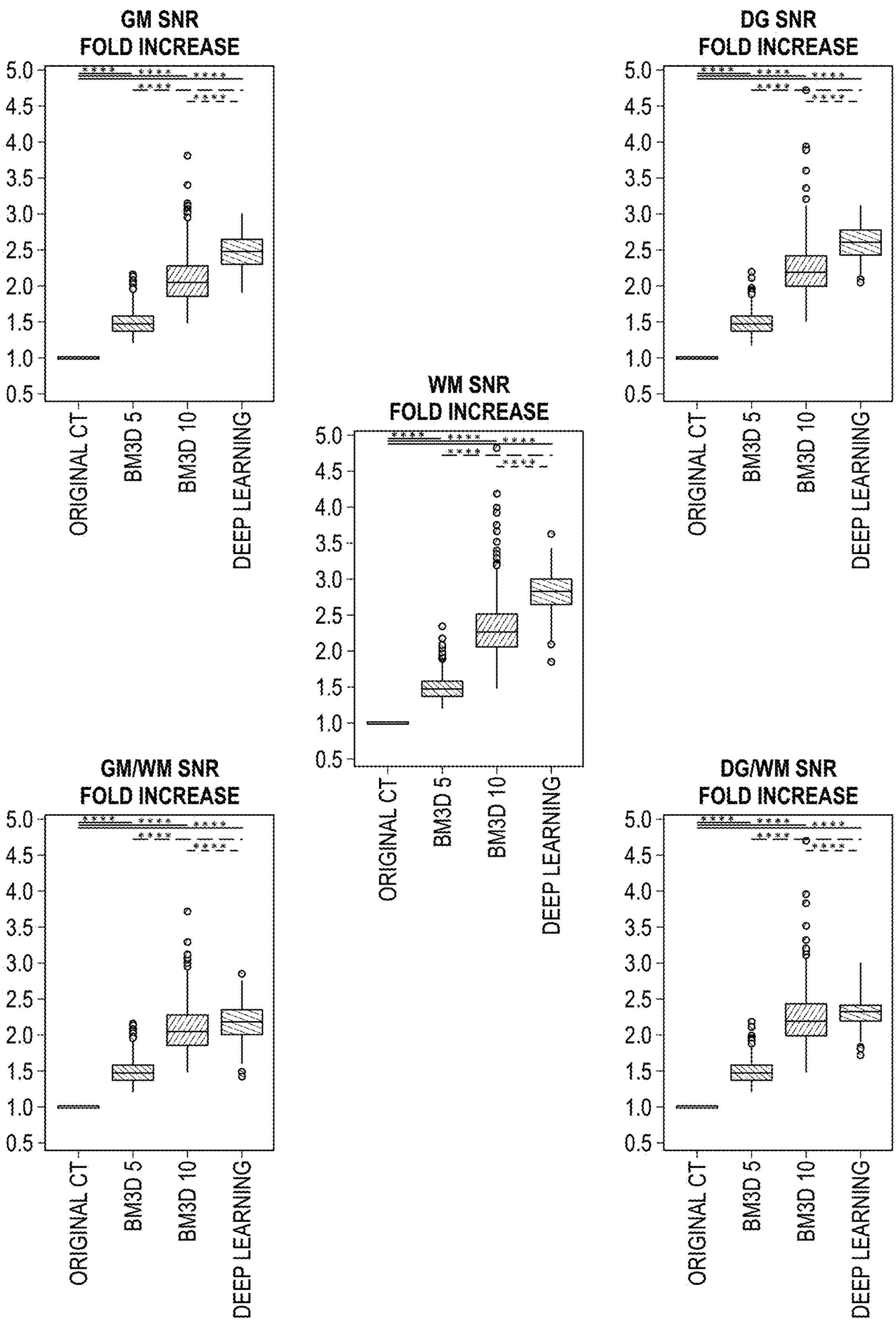
FIG. 4 illustrates signal-to-noise ratio (SNR) and contrast-to-noise ratio (CNR) comparison on denoised CT scans by model on the 307 hold-out test patients (380 scans). The SNR and CNR were measured in the cerebral cortex grey matter (GM), corpus callosum white matter (WM), and thalamus deep grey matter (DG). SNR and CNR fold-increases were defined as the ratio of model SNR over original SNR and model CNR over original CNR, respectively. Regarding the boxplots, the middle line marks the median, the ends of the box mark the first and third quartiles, the whiskers mark 1.5*IQR from the ends of the box, and the outliers are represented with individual points. The SNR and CNR comparisons were tested using the one-tailed paired t-test. Significance levels are marked with asterisks. ns indicates $p>0.05$; * indicates $p<0.05$;  indicates $p<0.01$; * indicates $p<0.001$; **** indicates $p<0.0001$.

Table 4 reports the SNR and CNR in GM, WM, and DG as the mean±SD. The summary SNR and CNR fold-increases in GM, WM, and DG relative to the original CT in the test cases are shown in FIG. 4. The mean GM SNR fold-increase over the original CT is significantly higher (one-tailed paired t-test, $p<0.0001$) for our deep learning model (2.47±0.23) compared to BM3D 5 (1.49±0.17) and BM3D 10 (2.09±0.35). Mean WM SNR fold-increase was also significantly higher (one-tailed paired t-test, $p<0.0001$) for the deep learning model (2.83±0.25), compared to BM3D 5 (1.51±0.16) and BM3D 10 (2.31±0.41). Similar improvements occur in the mean DG SNR fold-increase for the deep learning model (2.64±0.19) compared to BM3D 5 (1.50±0.15) and BM3D 10 (2.25±0.37) at the $p<0.0001$ threshold in one-tailed paired t-test. The average improvements in SNR in GM, WM, and DG provided by our denoising model are 64%, 85%, 74% higher than the BM3D 5 model and 16%, 21%, and 16% higher than the BM3D 10 model, respectively.

This denoising model had a significantly higher CNR fold-increase of DG/WM (2.30±0.18) compared to BM3D 5 (1.50±0.15, $p<0.0001$) and BM3D10 (2.25±0.37, $p<0.01$). It also had similar improvements for the CNR fold-increase of GM/WM (2.16±0.23) versus BM3D 5 (1.49±0.17, $p<0.0001$) and BM3D 10 (2.09±0.35, $p<0.0001$). The average improvements of CNR in DG/WM and GM/WM provided by our denoising model are 53% and 45% higher than the BM3D 5 model and 2% and 3% higher than the BM3D 10 model respectively.

Figure 5:
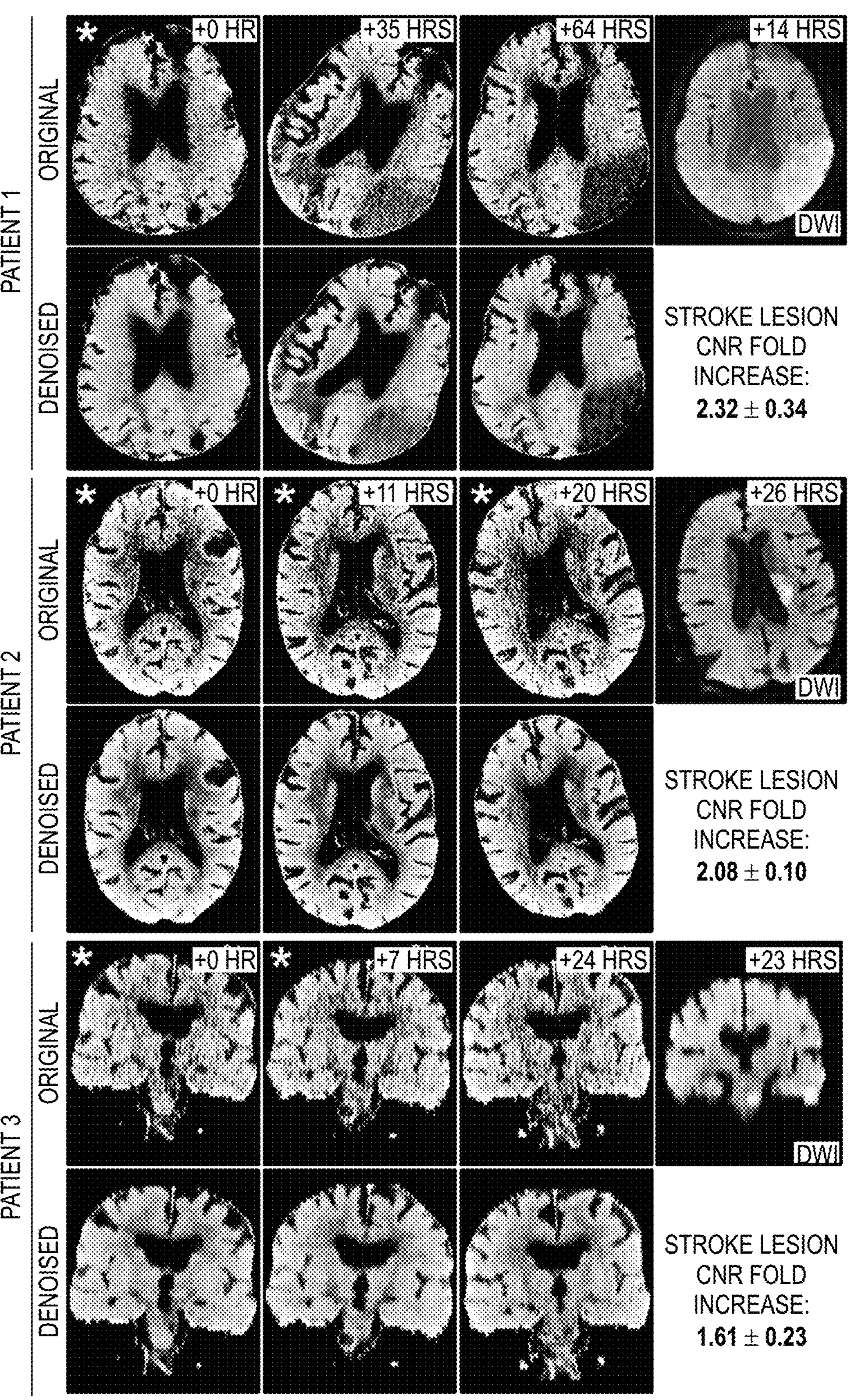
FIG. 5 shows an original and denoised CT images of three patients with hyperacute stroke with three scans per patient are displayed alongside confirmatory DWI showing the respective lesion location. Images marked with asterisk represent scans in which ischemic stroke lesions were missed in the initial reading. CNR fold-increase across the scans for each patient is reported as mean±standard deviation. The hours elapsed from the first scan is displayed in the upper right corner of the original CT and DWI images.

In a representative cohort of three patients with missed hyperacute ischemic stroke, the denoising model increased CNR between ischemic and contralateral normal tissue by 2.1-fold to 2.3-fold in the brain whereas CNR increased by 1.6-fold in the pons. In missed lesions for patients 1 and 2, CNR ranged between 0.22 to 0.71 whereas the missed pons lesion has a CNR of 1.4. Visual comparisons between original and denoised are shown in FIG. 5.

Figure 6:
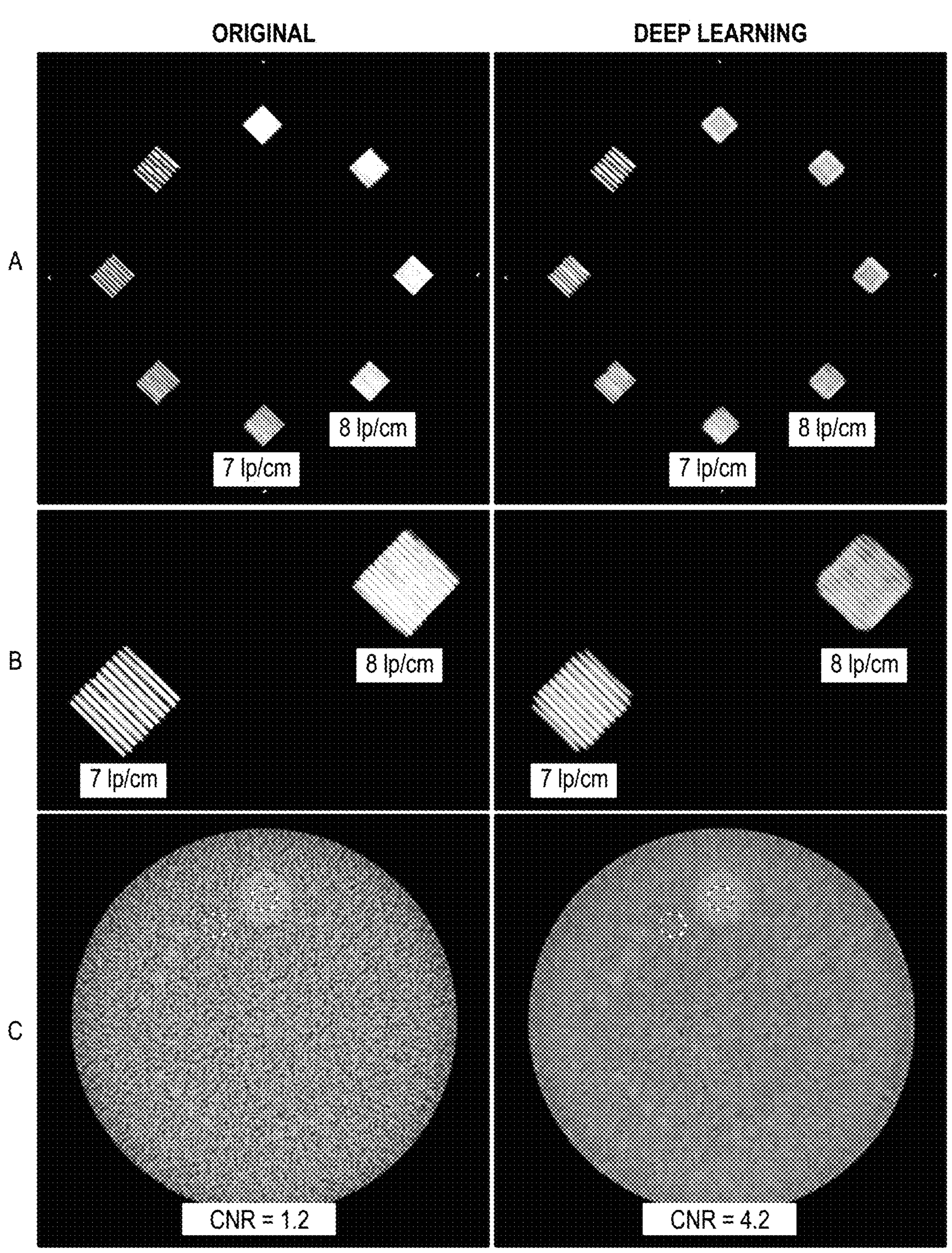
FIG. 6A, FIG. 6B, and FIG. 6C show particular illustrative aspects of the present invention.

The impact on high-contrast and low-contrast spatial resolution was assessed on the ACR 464 accreditation phantom (FIG. 6A, FIG. 6B, and FIG. 6C). Visually, there is resolution degradation in the square with 8-line pairs per centimeter (lp/cm) after denoising, compared to the initial image. In both images, the 7 lp/cm square is clearly visible. In the low-contrast resolution phantom, CNR increased from 1.2 to 4.2 after denoising.

Discussion

Using a rotation-reflection equivariant G-CNN deep learning method applied to non-contrast head CT scans (NCCT) of patients with acute ischemic stroke (AIS), we demonstrated significant reductions in image noise as measured by 2.4-fold to 2.8-fold SNR increases in different tissue types while maintaining high anatomical fidelity and enhancing grey/white matter discrimination in head NCCT scans by 2.1-fold to 2.3-fold. This model demonstrated significantly superior performance to Block-matching and 3D filtering (BM3D) on 380 unseen NCCT head scans (25,773 images) from 307 unique patients. In recent years, deep learning methods have given rise to numerous models that outperform BM3D. In particular, RED-CNN (3) maps low-dose CT to full-dose CT and demonstrated competitive performance against standard denoising methods, including BM3D, on a public clinical dataset with chest and abdomen CT images. Compared to traditional CNN approaches, our model has rotation-reflection equivariance, which is more robust to different image transformations. Although our presented model is trained on head NCCT, this approach can be applied to other organ systems. While other work has been done in low-dose and ultra-low-dose CT denoising to restore SNR to the level of the original full-dose CT in the chest (3), abdomen (21), and pelvis (22), none, to the inventors' knowledge, have attempted denoising through patient scan aggregation, as the present method have. Additionally, the study denoises full-dose NCCT to improve the SNR and CNR, providing better visualization between tissue types which may accentuate acute neurologic conditions such as stroke, tumors, and other lesions in the brain during early symptom onset. This may enable earlier and more accurate diagnoses, which can decrease time to intervention, especially in rural and ED settings where MRI may not be accessible.

The inventors' investigated whether our model could improve stroke lesion visualization. Recent human studies demonstrate a 2%/hour rate of net water uptake in the early infarct core for the initial 4 hours (23). Each 1% increase of brain tissue water corresponds to a 1.8-2.6 Hounsfield units (HU) drop (24, 25). During the first three hrs of ischemic stroke, the expected 2-4 HU decrease on NCCT nears the lowest detectable limit of human visual inspection (26-28). This precludes most stroke detection (29-34) in the initial NCCT scans within three hours of onset, increasing the risk of missed diagnosis (32). CNR fold-increase was used between ischemic tissue and contralateral normal tissue as surrogate quantitative marker for improved visualization in addition to visual comparison. In cases where acute ischemia was missed in the initial diagnosis, increasing CNR between ischemic and normal tissue may help readers better detect subtle signs of ischemia. For example, a pontine stroke was missed in the first two scans for Patient 3. The pontine lesion CNRs were 3.6 and 1.2 respectively before denoising and 6.4 and 1.6 respectively after denoising. Similarly, an ischemic region in the left fronto-parietal region was missed in the first CT scan for patient 1. After denoising, the loss of gray-white differentiation is more noticeable. Of note, higher mean shifts in CT attenuation values for evolving stroke lesions were observed in smaller lesions, likely due to the denoising algorithm not being optimized for smaller lesions approaching the model's kernel size.

The present model is trained by minimizing a loss function containing a term for mean-squared error (MSE), a common denoising metric, with additional terms ensuring the noise distribution is zero-centered and not skewed. Another denoising performance metric is structural similarity index (SSIM) (35), which focuses on similarity of anatomic structure preservation with a reference image. The inventors did not include SSIM in loss function because it is non-trivially affected by the cumulative effect of beam hardening in repeated CT scans. While SSIM may provide a more relevant measure of image quality, it is sensitive to distortion from common variations in CT image acquisition, including rotation, translation, scaling, misalignment, and warping.

MSE and SSIM assume the gold-standard image to be totally noise-free. In practice, varying acquisition parameters, hardware limitations, and human factors, such as high BMI and patient motion, make it nearly impossible to generate totally noise-free comparison standards for CT images. For this study, a quasi-gold standard was established with mean CT images that leveraged the cumulative information of multiple CT scans. While SNR and CNR quantify the intrinsic image signal strength relative to background noise, potentially relevant measurements of key anatomical brain structures are not included. Although challenging to quantify, direct visual comparison is the most relevant measure of image quality for clinical end users.

While the datasets featured a natural variation in SNR due to different protocols, scanners, and radiation dosing in the patient population, this model is not optimized for highly noisy images, such as from patients with high BMI. Lesions near the skull edge may also be challenging to denoise due to artifact contamination from the skull. Additionally, to enable a dataset featuring repeated CT scans in a short timeframe, the scans were only collected from a registry of patients with stroke. To address chronic and evolving stroke, attenuation thresholding was used in the training loss algorithm. This excluded areas of tissue that significantly evolved between scans from the training loss function, such as necrosis or hemorrhage, while including stable and persistent infarcts. This enabled better generalization to non-stroke NCCT scans. Since full-dose CT images were used exclusively in our model, its ability to denoise low-dose or ultra-low-dose CT images cannot be assessed. Additional studies including patients with other neurological diseases from multiple hospitals, in addition to lower-dose CT images, may further improve both the denoising performance and wider relevance of the model.

This model's impact on spatial resolution is minor. A small resolution degradation was found in the square with 8 lp/cm in the high-contrast phantom and improved CNR in the low-contrast phantom. The denoising model was not trained on any phantom images, so the exact mechanism of this impact is difficult to determine. Additionally, the phantom's density distribution is different from that of the datasets used in the model's training and testing, suggesting that the model may be robust to intensity ranges outside of the training data.

Due to the recent availability of reconstruction-based deep learning CT denoising, it would be interesting to investigate synergistic potential with image-space denoising. Ultimately, to validate the clinical utility of the denoising model, prospective studies are needed to assess whether denoising improves the detection rate of stroke or other neurological insults among readers of varying experience and determine whether these cases would have been missed without denoising.

REFERENCES

The following references, to the extent that they provide exemplary procedural or other details supplementary to those set forth herein, are specifically incorporated herein by reference:

U.S. Pat. No. 9,332,953 B2 2016 Supervised machine learning technique for reduction of radiation dose in computed tomography imaging.

Chinese Patent Appl. No. N110070510A 2019 A kind of CNN medical image denoising method for extracting feature based on VGG-19.

U.S. Pat. No. 9,332,953 B2 2016 Supervised machine learning technique for reduction of radiation dose in computed tomography imaging.

1. Powers W J, Rabinstein A A, Ackerson T, Adeoye O M, Bambakidis N C, Becker K, Biller J, Brown M, Demaerschalk B M, Hoh B, Jauch E C, Kidwell C S, Leslie-Mazwi T M, Ovbiagele B, Scott P A, Sheth K N, Southerland A M, Summers D V, Tirschwell D L. Guidelines for the Early Management of Patients With Acute Ischemic Stroke: 2019 Update to the 2018 Guidelines for the Early Management of Acute Ischemic Stroke: A Guideline for Healthcare Professionals From the American Heart Association/American Stroke Association. Stroke, 50(12): e344-e418. 2019; doi: 10.1161/str.0000000000000211.
2. Wintermark M, Sanelli P C, Anzai Y, Tsiouris A J, Whitlow C T, Institute AHI. Imaging evidence and recommendations for traumatic brain injury: conventional neuroimaging techniques. *J. Am. Coll. Radiol.,* 12(2):e1-14, 2015; doi: 10.1016/j.jacr.2014.10.014.
3. Chen H, Zhang Y, Kalra M K, Lin F, Chen Y, Liao P, Zhou J, Wang G. Low-Dose CT With a Residual Encoder-Decoder Convolutional Neural Network. *IEEE Trans. Med. Imaging,* 36(12):2524-2535, 2017; doi: 10.1109/TMI.2017.2715284.
4. Gou S, Liu W, Jiao C, Liu H, Gu Y, Zhang X, Lee J, Jiao L. Gradient regularized convolutional neural networks for low-dose CT image enhancement. *Phys. Med. Biol.,* 64(16):165017. 2019; doi: 10.1088/1361-6560/ab325e.
5. Kang E, Min J, Ye J C. A deep convolutional neural network using directional wavelets for low-dose X-ray CT reconstruction. *Med. Phys.,* 44(10):e360-e375. 2017; doi: 10.1002/mp.12344.
6. Bai T, Yan H, Jia X, Jiang S, Wang G, Mou X. Z-Index Parameterization for Volumetric CT Image Reconstruction via 3-D Dictionary Learning. *IEEE Trans. Med. Imaging,* 36(12):2466-2478. 2017; doi: 10.1109/TMI.2017 0.2759819.
7. Zhao T, Hoffman J, McNitt-Gray M, Ruan D. Ultra-low-dose CT image denoising using modified BM3D scheme tailored to data statistics. *Med. Phys.,* 46(1):190-198. doi: 10.1002/mp.13252.
8. Dabov K, Foi A, Katkovnik V, Egiazarian K. BM3D Image Denoising with Shape-Adaptive Principal Component Analysis. SPARS'09-Signal Processing with Adaptive Sparse Structured Representations. Saint Malo, France 2009.
9. De Marco P, Origgi D. New adaptive statistical iterative reconstruction ASiR-V: Assessment of noise performance in comparison to ASiR. *J. Appl.* Clin. *Med. Phys.,* 19(2): 275-286. 2018; doi: 10.1002/acm2.12253.
10. Ding Y, Hu T. Low-dose computed tomography scheme incorporating residual learning-based denoising with iterative reconstruction. *Electronics Lett.,* 55(4): 174-176, 2019.
11. Euler A, Solomon J, Marin D, Nelson R C, Samei E. A third-generation adaptive statistical iterative reconstruction technique: phantom study of image noise, spatial resolution, lesion detectability, and dose reduction potential. *Am. J. Roentgen.,* 2018:1301-1308.
12. Lyu Q, Yang C, Gao H, Xue Y, O'Connor D, Niu T, Sheng K. Iterative megavoltage CT (MVCT) reconstruction using block-matching 3D-transform (BM 3D) regularization. *Med. Phys.,* 45(6):2603-2610; 2018.
13. Vandeghinste B, Goossens B, Van Holen R, Vanhove C, Pižurica A, Vandenberghe S, Staelens S. Iterative CT reconstruction using shearlet-based regularization. *IEEE Transactions on Nucl. Sci.,* 60(5):3305-3317, 2013.
14. Xie S, Zheng X, Chen Y, Xie L, Liu J, Zhang Y, Yan J, Zhu H, Hu Y. Artifact Removal using Improved GoogLeNet for Sparse-view CT Reconstruction. *Sci. Rep.,* 8(1): 6700; 2018; doi: 10.1038/s41598-018-25153-w.
15. Penny W D, Friston K J, Ashburner J T, Kiebel S J, Nichols T E. Statistical parametric mapping: the analysis of functional brain images: Elsevier, 2011.
16. Cohen T, Welling M. Group Equivariant Convolutional Networks. In: Maria Florina B, Kilian Q W, eds. Proceedings of The 33rd International Conference on Machine Learning. *Proc. Machine Learning Res.: PMLR,* 2016: 2990-2999.
17. Veeling B S, Linmans J, Winkens J, Cohen T, Welling M. Rotation Equivariant CNNs for Digital Pathology. Cham: Springer International Publishing, 2018:210-218.
18. Abadi M, Agarwal A, Barham P, Brevdo E, Chen Z, Citro C, Corrado G S, Davis A, Dean J, Devin M, Ghemawat S, Goodfellow I, Harp A, Irving G, Isard M, Jia Y, Jozefowicz R, Kaiser L, Kudlur M, Levenberg J, Mane D, Monga R, Moore S, Murray D, Olah C, Schuster M, Shlens J, Steiner B, Sutskever I, Talwar K, Tucker P, Vanhoucke V, Vasudevan V, Viégas F, Vinyals O, Warden P, Wattenberg M, Wicke M, Yu Y, Zheng X. TensorFlow: Large-Scale Machine Learning on Heterogeneous Systems. 2015.

19. Rorden C, Brett M. Stereotaxic display of brain lesions. *Behav. Neurol.*, 2000; 12(4):191-200; 2013; doi: 10.1155/2000/421719.

20. Team R C. R: A language and environment for statistical computing. Vienna, Austria: R Foundation for Statistical Computing, 2019.

21. Kaur R, Juneja M, Mandal A K. A comprehensive review of denoising techniques for abdominal CT images. *Multimedia Tools Appl.*, 77(17):22735-22770; 2018.

22. Yan L, Yi Z. Low-dose CT restoration via stacked sparse denoising autoencoders. *Neurocomputing*, 284:80-89, 5 Apr. 2018.

23. Broocks G, Flottmann F, Scheibel A, Aigner A, Faizy T D, Hanning U, Leischner H, Broocks S I, Fiehler J, Gellissen S, Kemmling A. Quantitative Lesion Water Uptake in Acute Stroke Computed Tomography Is a Predictor of Malignant Infarction. *Stroke*, 49(8): 1906-1912; 2018; doi: 10.1161/Strokeaha.118.020507.

24. Kucinski T, Vaterlein O, Glauche V, Fiehler J, Klotz E, Eckert B, Koch C, Rother J, Zeumer H. Correlation of apparent diffusion coefficient and computed tomography density in acute ischemic stroke. *Stroke*, 33(7):1786-1791; 2002.

25. Unger E, Littlefield J, Gado M. Water content and water structure in C T and M R signal changes: possible influence in detection of early stroke. *AJNR Am. J. Neuroradiol.*, 9(4):687-691; 1988.

26. Tanaka C, Ueguchi T, Shimosegawa E, Sasaki N, Johkoh T, Nakamura H, Hatazawa J. Effect of CT acquisition parameters in the detection of subtle hypoattenuation in acute cerebral infarction: a phantom study. *AJNR Am. J. Neuroradiol.*, 27(1):40-45; 2006.

27. Dzialowski I, Weber J, Doerfler A, Forsting M, von Kummer R. Brain tissue water uptake after middle cerebral artery occlusion assessed with CT. *J. Neuroimaging*, 14(1):42-48; 2004.

28. Hara H, Muraishi H, Matsuzawa H, Inoue T, Nakajima Y, Satoh H, Abe S. Virtual monochromatic imaging in dual-source and dual-energy CT for visualization of acute ischemic stroke. *J. Korean Phys. Soc.*, 67(1):103-107; 2015; doi: 10.3938/jkps.67.103.

29. Shake A, Oostema A, Jones J. BET 2: Missed diagnosis of ischaemic stroke in the emergency department. Emerg. *Med. J.*, 35(12):768-769; 2018; doi: 10.1136/emermed-2018-208261.2.

30. Tarnutzer A A, Lee S H, Robinson K A, Wang Z, Edlow J A, Newman-Toker D E. ED misdiagnosis of cerebrovascular events in the era of modern neuroimaging: A meta-analysis. *Neurology*, 88(15):1468-1477; 2017; doi: 10.1212/WNL.0000000000003814.

31. Newman-Toker D E, Moy E, Valente E, Coffey R, Hines A L. Missed diagnosis of stroke in the emergency department: a cross-sectional analysis of a large population-based sample. *Diagnosis* (*Berl*)., 1(2):155-166; 2014; doi: 10.1515/dx-2013-0038.

32. Arch A E, Weisman D C, Coca S, Nystrom K V, Wira C R, Schindler J L. Missed Ischemic Stroke Diagnosis in the Emergency Department by Emergency Medicine and Neurology Services. *Stroke*, 47(3):668-673; 2016; doi: 10.1161/STROKEAHA. 115.010613.

33. Madsen T E, Khoury J, Cadena R, Adeoye O, Alwell K A, Moomaw C J, McDonough E, Flaherty M L, Ferioli S, Woo D, Khatri P, Broderick J P, Kissela B M, Kleindorfer D. Potentially Missed Diagnosis of Ischemic Stroke in the Emergency Department in the Greater Cincinnati/Northern Kentucky Stroke Study. *Acad. Emerg. Med.*, 23(10): 1128-1135; 2016; doi: 10.1111/acem.13029.

34. Liberman A L, Prabhakaran S. Stroke Chameleons and Stroke Mimics in the Emergency Department. *Curr. Neurol. Neurosci. Rep.*, 17(2): 15; 2017; doi: 10.1007/s11910-017-0727-0.

35. Wang Z, Bovik A C. Modern image quality assessment. *Synthesis Lectures on Image, Video, and Multimed. Proc.*, 2(1):1-156; 2006.

It should be understood that the examples and embodiments described herein are for illustrative purposes only and that various modifications or changes in light thereof will be suggested to persons skilled in the art and are to be included within the spirit and purview of this application and the scope of the appended claims. All references, including publications, patent applications and patents, cited herein are specifically incorporated herein by reference to the same extent as if each reference was individually and specifically indicated to be incorporated by reference, and was set forth in its entirety herein. Recitation of ranges of values herein are merely intended to serve as a shorthand method of referring individually to each separate value falling within the range, unless otherwise indicated herein, and each separate value is incorporated into the specification as if it were individually recited herein.

The description herein of any aspect or embodiment of the invention using terms such as "comprising," "having," "including," or "containing," with reference to an element or elements is intended to provide support for a similar aspect or embodiment of the invention that "consists of," "consists essentially of," or "substantially comprises" the particular element or elements, unless otherwise stated or clearly contradicted by context (e.g., a composition described herein as comprising a particular element should be understood as also describing a composition consisting of that element, unless otherwise stated or clearly contradicted by context).

All of the compositions and methods disclosed and claimed herein can be made and executed without undue experimentation in light of the present disclosure. While the compositions and methods of this invention have been described in terms of preferred embodiments, it will be apparent to those of ordinary skill in the art that variations may be applied to the compositions and methods and in the steps or in the sequence of steps of the method described herein without departing from the concept, spirit and scope of the invention. More specifically, it will be apparent that certain agents that are chemically- or physiologically-related may be substituted for the agents described herein while the same or similar results would be achieved. All such similar substitutes and modifications apparent to those ordinarily skilled in the art are deemed to be within the spirit, scope, and concept of the invention as defined by the appended claims.

What is claimed is:

1. A method comprising:

training a convolutional neural network (CNN) with low noise training data to generate a trained CNN configured to generate denoised Computed Tomography (CT) images of a subject from raw CT images of the same, the low noise training data comprising multiple noisy CT images of the same subject that are visually different, wherein the multiple noisy CT images of the same subject are processed by employing multiple timepoint CT images having similarity between repeated scans for a given patient, and wherein the multiple noisy CT images are intensity normalized and spatially co-registered at each timepoint among the multiple noisy CT images, and wherein different timepoint CT images are processed to remove skull and extracranial bright area from the multiple noisy CT images for the training.

2. The method of claim 1, wherein different timepoint CT images are (i) free from distortions and (ii) unique due to variations in date and time of acquisition, scanner manufacturer or model, imaging protocols, radiation dose, head position, or imaging plane.

3. The method of claim 1, wherein different timepoint CT images are retrieved and determined to have normal variations of image noise, imaging planes, and head positions.

4. The method of claim 1, wherein the CNN has an encoder-decoder architecture.

5. The method of claim 1, wherein the trained CNN is configured to (i) reduce image noise in brain tissue between 2.5 times to 3.5 times, (ii) increase contrast of detection between about 2.5 times to 3.5 times, or (iii) reduce image noise by about sqrt (n) where n is the number of noisy CT images of the respective given person used for the training.

6. The method of claim 1, wherein the trained CNN is a rotation-reflection equivariant U-Net with group convolutional neural network.

7. The method of claim 4, wherein the multiple timepoint CT images had a normalized image attenuation distribution normalized by shifting an attenuation mode to a fixed value to eliminate attenuation shifts due to scanner calibration.

8. The method of claim 1, wherein the training employs a loss function having a weighted sum of a mean-square error, a modal shift of an image noise, and a skewness of the image noise.

9. The method of claim 8, wherein the loss function is defined as:

$$1/n\Sigma MSE+w_1|M|+w_2|S|$$

where n is a number of training samples, MSE is the mean-square error between the predicted CT and mean CT, M and S are the mode and skewness coefficient, respectively, of the noise distribution calculated by the voxel-wise attenuation difference between the input and predicted CT, and $w_1$ and $w_2$ are the weight of the term.

* * * * *